United States Patent
Han et al.

(10) Patent No.: US 10,908,772 B2
(45) Date of Patent: Feb. 2, 2021

(54) METHOD AND APPARATUS FOR ADJUSTING RUNNING STATE OF SMART HOUSING DEVICE

(71) Applicant: Xiaomi Inc., Beijing (CN)

(72) Inventors: Guangyi Han, Beijing (CN); Ming Zhao, Beijing (CN); Enxing Hou, Beijing (CN)

(73) Assignee: Xiaomi Inc., Beijing (CN)

(*) Notice: Subject to any disclaimer, the term of this patent is extended or adjusted under 35 U.S.C. 154(b) by 823 days.

(21) Appl. No.: 15/162,980

(22) Filed: May 24, 2016

(65) Prior Publication Data

US 2016/0266768 A1    Sep. 15, 2016

Related U.S. Application Data

(63) Continuation of application No. PCT/CN2015/077885, filed on Apr. 29, 2015.

(30) Foreign Application Priority Data

Nov. 27, 2014   (CN) .......................... 2014 1 0706098

(51) Int. Cl.
*G06F 3/0481*    (2013.01)
*G06F 3/0484*    (2013.01)
(Continued)

(52) U.S. Cl.
CPC ........ *G06F 3/04817* (2013.01); *G06F 3/0482* (2013.01); *G06F 3/04847* (2013.01);
(Continued)

(58) Field of Classification Search
CPC .............. G06F 3/04817; G06F 3/0482; G06F 3/04847; G06F 3/0484; H04L 12/282;
(Continued)

(56) References Cited

U.S. PATENT DOCUMENTS

| | | | |
|---|---|---|---|
| 7,904,187 | B2 | 3/2011 | Hoffberg et al. |
| 7,966,078 | B2 | 6/2011 | Hoffberg et al. |

(Continued)

FOREIGN PATENT DOCUMENTS

| | | |
|---|---|---|
| CN | 102572334 A | 7/2012 |
| CN | 102710473 A | 10/2012 |

(Continued)

OTHER PUBLICATIONS

Brookes, "Light Your Home the Smart Way With Philips Hue", http://www.makeuseof.com/tag/light-your-home-the-smart-way-with-philips-hue, Jul. 7, 2014.*

(Continued)

*Primary Examiner* — Beau D Spratt
(74) *Attorney, Agent, or Firm* — Finnegan, Henderson, Farabow, Garrett & Dunner, L.L.P.

(57) ABSTRACT

A method for adjusting an operating state of a smart housing device includes monitoring a device list in a control application on a mobile terminal. The control application is configured to control the smart housing device. The method further includes, when an instruction for creating a shortcut key for controlling the smart housing device is detected, creating the shortcut key on a desktop of the mobile terminal and adjusting an operating state of the smart housing device in response to actuation of the shortcut key.

7 Claims, 9 Drawing Sheets

(51) Int. Cl.
*H04M 1/725* (2006.01)
*H04L 12/28* (2006.01)
*G06F 3/0482* (2013.01)
*H04L 29/08* (2006.01)

(52) U.S. Cl.
CPC ............ *H04L 12/282* (2013.01); *H04L 67/10* (2013.01); *H04M 1/72533* (2013.01); *H04M 2250/22* (2013.01)

(58) Field of Classification Search
CPC .............. H04L 67/10; H04M 1/72533; H04M 2250/22; G05B 2219/2642; G05B 19/418; G05B 15/02
See application file for complete search history.

(56) References Cited

U.S. PATENT DOCUMENTS

| | | | |
|---|---|---|---|
| 8,165,946 B2 | 4/2012 | Anderson | |
| 8,369,967 B2 | 2/2013 | Hoffberg et al. | |
| 8,583,263 B2 | 11/2013 | Hoffberg et al. | |
| 8,732,617 B1* | 5/2014 | Armstrong | G06F 3/04817 715/835 |
| 9,462,041 B1* | 10/2016 | Hagins | H04L 67/10 |
| 9,529,344 B1* | 12/2016 | Hagins | G05B 15/02 |
| D809,560 S* | 2/2018 | Alfonzo | D14/492 |
| 10,031,494 B2* | 7/2018 | Holaso | G05B 15/02 |
| D830,409 S* | 10/2018 | Agarwal | D14/488 |
| 2006/0200253 A1 | 9/2006 | Hoffberg et al. | |
| 2006/0200259 A1 | 9/2006 | Hoffberg et al. | |
| 2007/0016476 A1 | 1/2007 | Hoffberg et al. | |
| 2007/0197236 A1 | 8/2007 | Ahn et al. | |
| 2008/0082930 A1* | 4/2008 | Omernick | G06F 1/1626 715/765 |
| 2008/0153469 A1 | 6/2008 | Park et al. | |
| 2009/0140064 A1* | 6/2009 | Schultz | F24F 11/30 236/51 |
| 2010/0245107 A1* | 9/2010 | Fulker | H04L 12/2803 340/691.6 |
| 2010/0287469 A1* | 11/2010 | Wang | G06F 1/1626 715/702 |
| 2011/0060994 A1* | 3/2011 | Maxwell | G06F 3/147 715/730 |
| 2011/0093799 A1* | 4/2011 | Hatambeiki | G08C 17/02 715/763 |
| 2011/0156896 A1 | 6/2011 | Hoffberg et al. | |
| 2011/0167110 A1 | 7/2011 | Hoffberg et al. | |
| 2012/0023212 A1* | 1/2012 | Roth | H04L 12/282 709/223 |
| 2012/0023215 A1* | 1/2012 | Tseng | H04L 12/2809 709/223 |
| 2012/0130513 A1* | 5/2012 | Hao | G05B 15/02 700/90 |
| 2012/0210268 A1* | 8/2012 | Hilbrink | G06F 3/0484 715/773 |
| 2012/0284658 A1* | 11/2012 | Hirvonen | G06F 3/04817 715/779 |
| 2013/0024799 A1* | 1/2013 | Fadell | G05D 23/1902 715/771 |
| 2013/0054863 A1* | 2/2013 | Imes | H04L 12/2827 710/304 |
| 2013/0117742 A1* | 5/2013 | Newell | G06F 9/45545 718/1 |
| 2013/0139113 A1 | 5/2013 | Choudhary et al. | |
| 2013/0219341 A1* | 8/2013 | Lee | G06F 3/0482 715/835 |
| 2013/0263034 A1* | 10/2013 | Bruck | G05D 23/1904 715/771 |
| 2014/0006540 A1 | 1/2014 | Rao et al. | |
| 2014/0089241 A1 | 3/2014 | Hoffberg et al. | |
| 2014/0101617 A1* | 4/2014 | Yang | G06K 9/00288 715/846 |
| 2014/0167931 A1* | 6/2014 | Lee | H04L 12/2818 340/12.5 |
| 2014/0173452 A1 | 6/2014 | Hoffberg et al. | |
| 2014/0215367 A1* | 7/2014 | Kim | G06Q 10/10 715/765 |
| 2014/0218517 A1 | 8/2014 | Kim et al. | |
| 2014/0258937 A1 | 9/2014 | Lee | |
| 2014/0317527 A1* | 10/2014 | Won | G06F 3/04897 715/746 |
| 2014/0319232 A1* | 10/2014 | Gourlay | G05D 23/1905 236/51 |
| 2015/0140990 A1* | 5/2015 | Kim | H04W 8/186 455/418 |
| 2015/0227301 A1* | 8/2015 | VanBlon | G06F 3/0488 715/765 |
| 2015/0331551 A1* | 11/2015 | Lee | G06F 3/04817 715/781 |
| 2015/0339009 A1* | 11/2015 | Seo | G06F 3/0482 715/739 |
| 2016/0092847 A1* | 3/2016 | Buchbinder | G06Q 30/0635 705/26.8 |
| 2018/0023832 A1* | 1/2018 | Fadell | G05D 23/1902 700/278 |
| 2018/0191807 A1* | 7/2018 | Dawes | H04L 67/12 |

FOREIGN PATENT DOCUMENTS

| | | | |
|---|---|---|---|
| CN | 103034537 A | 4/2013 | |
| CN | 103078996 A | 5/2013 | |
| CN | 103139305 A | 6/2013 | |
| CN | 103425397 A | 12/2013 | |
| CN | 103716214 A | 4/2014 | |
| CN | 104363154 A | 2/2015 | |
| CN | 104407592 A | 3/2015 | |
| JP | 2012099869 A | 5/2012 | |
| KR | 20120093740 A | 8/2012 | |
| KR | 20140032262 A | 3/2014 | |
| RU | 101548 U1 | 1/2011 | |
| RU | 2463636 C2 | 10/2012 | |
| WO | WO 2014/094532 A1 | 6/2014 | |

OTHER PUBLICATIONS

Cangeloso, "Review: Philips Hue is where gadgets, apps, and lighting meet", http://www.geek.com/review/review-philips-hue-system-is-where-gadgetery-and-lighting-meet-1525065, Oct. 29, 2012.*
Eliot, "Home Automation Dashboard", http://blog.smartthings.com/stories/home-automation-dashboard, Sep. 12, 2014.*
Holly, "Hue apps for Android: A look at the quirky, clumsy, wonderful world of smart lighting", http://www.geek.com/android/the-quirky-clumsy-and-wonderful-world-of-hue-control-on-android-1582289, Jan. 16, 2014.*
Huebscher et al., "Adaptive middleware for context-aware applications in smart-homes", 2nd Workshop on Middleware for Pervasive and Ad-Hoc Computing, 2004.*
Kartakis et al., "Control Smart Homes Easily with Simple Touch", Proceedings of the 2011 international ACM workshop on Ubiquitous meta user interfaces (Ubi-MUI '11), Dec. 2011.*
Preuveneers et al., "Intelligent widgets for intuitive interaction and coordination in smart home environments", Eighth International Conference on Intelligent Environments, Jun. 2012.*
Prindle, "New iOS 8 widget lets you control Philips Hue lights from Notifications Center", http://www.digitaltrends.com/home/philips-hue-notification-center-widget-ios8, Oct. 31, 2014.*
Sage, "Philips hue review: instant atmosphere for your home", http://www.androidcentral.com/philips-hue-review, Nov. 11, 2013.*
Tarantola, "The Best Apps to Get the Most Out of Your Hue Lighting", http://gizmodo.com/the-best-apps-to-get-the-most-out-of-your-hue-lighting-1459975166, Nov. 11, 2013.*
"Samsung to Acquire SmartThings, Leading Open Platform for the Internet of Things", Samsung press release, Aug. 15, 2014.*
"Speedy Hue", published @ https://play.google.com/store/apps/details?id=otnemem.hue.nfc.extender.full on Feb. 19, 2014, retrieved Sep. 21, 2019 from the Internet Archive Wayback Machine, archived on Sep. 2, 2014 @ https://web.archive.org/web/20140902202748/https://play.google.com/store/apps/details?id=otnemem.hue.nfc.e.*

(56) References Cited

OTHER PUBLICATIONS

"Switches for Hue", published at http://apps4hue.com/product/switches-for-hue/, retrieved on Sep. 21, 2019, published on Sep. 18, 2013.*
Office Action in counterpart Russian Application No. 2015124671/08(038485), dated Jun. 22, 2017.
Extended Search Report for European Application No. 15195325.4 from the European Patent Office, dated Mar. 24, 2016.
English version of International Search Report of PCT Application No. PCT/CN2015/077885, dated Sep. 2, 2015, issued by the ISA/CN—State Intellectual Property Office of the P.R. China.
*Come and Experience Samsung's Ambition and Feel Smart Home*, dated Jan. 8, 2014, retrieved Apr. 21, 2016 from http://m.mt.co.kr/renew/view.html?no=2014010806500082504#_adtep.
[*CES2014*] *Samsung, Raising Samsung Smart Home's Sail at CES*, dated Jan. 5, 2014, retrieved Apr. 27, 2016 from http://it.chosun.com/news/article_print.html?no=2529610.
International Search Report of International Application No. PCT/CN2015/077885, issued by the State Intellectual Property Office of P.R. China as ISA, dated Sep. 2, 2015 (5 pages).

* cited by examiner

Xiaomi smart socket
Socket is disabled, USB is disabled 12450

Small ant smart video recorder
Device is offline

Small ant smart camera
Alarm is disabled

Xiaomi bracelet
Total walked steps:

My mobile phone
Model: MI 4W

METHOD AND APPARATUS FOR ADJUSTING RUNNING STATE OF SMART HOUSING DEVICE

CROSS REFERENCE TO RELATED APPLICATIONS

This application is a Continuation of International Application No. PCT/CN2015/077885 with an international filing date of Apr. 29, 2015, which is based upon and claims priority to Chinese Patent Application No. CN201410706098.2, filed on Nov. 27, 2014, the entire contents of both of which are incorporated herein by reference.

TECHNICAL FIELD

The present disclosure relates to communication technologies and, more particularly, to a method and apparatus for adjusting an operating state of a smart housing device.

BACKGROUND

Generally, smart housing devices can be controlled, for example, by clicking corresponding control keys on a mobile phone application (app), to implement functions of the smart housing devices.

SUMMARY

In accordance with the present disclosure, there is provided a method for adjusting an operating state of a smart housing device. The method includes monitoring a device list in a control application on a mobile terminal. The control application is configured to control the smart housing device. The method further includes, when an instruction for creating a shortcut key for controlling the smart housing device is detected, creating the shortcut key on a desktop of the mobile terminal and adjusting an operating state of the smart housing device in response to actuation of the shortcut key.

Also in accordance with the present disclosure, there is provided an apparatus for adjusting an operating state of a smart housing device. The apparatus includes one or more processors and a memory storing computer code. The computer code, when executed by the one or more processors, causes the one or more processors to monitor a device list in a control application on a mobile terminal. The control application is configured to control the smart housing device. The computer code further causes the one or more processors to, when an instruction for creating a shortcut key for controlling the smart housing device is detected, create the shortcut key on a desktop of the mobile terminal and adjust an operating state of the smart housing device in response to actuation of the shortcut key.

Also in accordance with the present disclosure, there is provided a non-transitory computer-readable storage medium having stored therein computer code. The computer code, when executed by one or more processors of an apparatus, causes the apparatus to monitor a device list in a control application on a mobile terminal. The control application is configured to control the smart housing device. The computer code further causes the apparatus to, when an instruction for creating a shortcut key for controlling the smart housing device is detected, create the shortcut key on a desktop of the mobile terminal and adjust an operating state of the smart housing device in response to actuation of the shortcut key.

It shall be appreciated that the above general description and the detailed description hereinafter are only illustrative and interpretative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The smart housing device according to the embodiments of the present disclosure communicates with a terminal device via a communication interface of the Internet. The smart housing device may be, for example, a smart lamp, a smart coffee machine, a computer device, a safety assurance system, a video and sound system, a smart water heater, or a smart air conditioner. These devices all have an enabled state and a disabled state. In addition, depending on functions of each smart housing device, corresponding parameters of the smart housing device need to be adjusted. For example, adjustment and control of parameters such as temperature, humidity, cleanliness, and speed are needed for a smart air conditioner. Methods consistent with embodiments of the present disclosure can be implemented, for example, on a mobile terminal device, such as a smart phone or a tablet computer.

Figure 1:
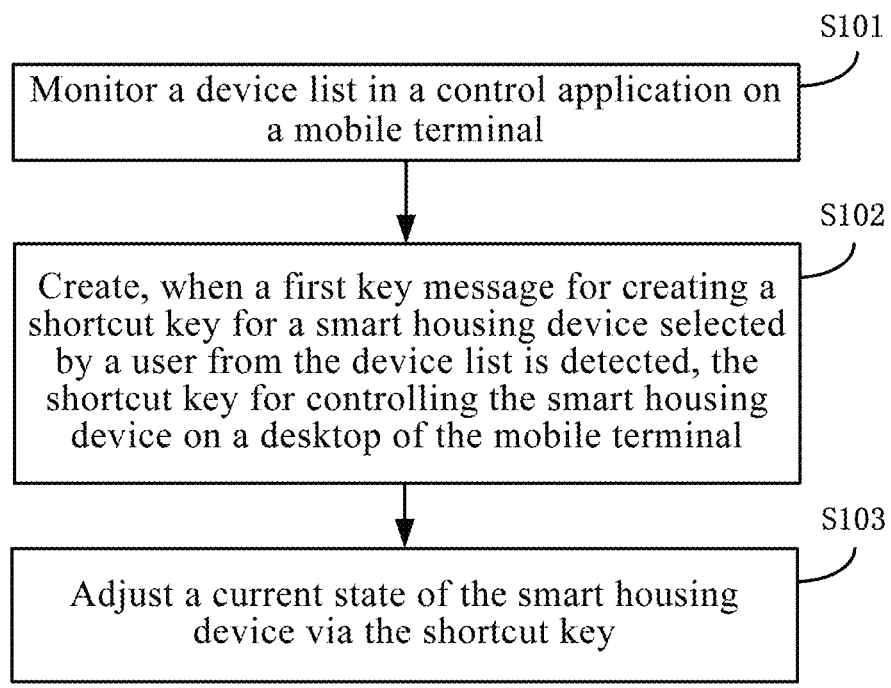
FIG. 1 is a flowchart illustrating a method for adjusting an operating state of a smart housing device according to an exemplary embodiment of the present disclosure.

FIG. 1 is a flowchart illustrating a method for adjusting an operating state of a smart housing device according to an exemplary embodiment of the present disclosure. As illustrated in FIG. 1, at S101, a device list in a control application on a mobile terminal is monitored. The control application is configured to control smart housing devices. In some embodiments, the device list in the application includes household electric appliances equipped with a communication interface, such as a smart socket, a smart electric stew pot, a smart air conditioner, a smart coffee machine, and the like. Such a household electric appliance can implement network-based communication with a network access device such as a mobile terminal, a cloud server, etc., via a network.

At S102, when a first key message for creating a shortcut key for a smart housing device selected by a user from the device list is detected, the shortcut key for controlling that smart housing device is created on a desktop of the mobile terminal. For example, if the user selects a smart socket in the device list, a shortcut key for controlling the smart socket is created on the desktop of the mobile terminal. As another example, if the user selects a smart camera in the device list, a shortcut key for controlling the smart camera is created on the desktop of the mobile terminal.

At S103, a current state of the smart housing device is adjusted via the shortcut key. For example, when the user leaves home for work with the mobile terminal, the smart socket in the home needs to be disabled. In this scenario, the user can adjust the current state of the smart socket to the disabled state using the shortcut key for controlling the smart socket that has been created on the desktop of the mobile terminal.

In some embodiments, after the shortcut key for a smart housing device is created, the current state of the smart housing device can be acquired from a cloud server. The current state of the smart housing device can further be displayed on the shortcut key.

In some embodiments, adjusting the current state of the smart housing device further includes monitoring a second key message of the shortcut key and, when the second key message is detected, sending an adjustment instruction for adjusting the smart housing device to a cloud server. The cloud server then adjusts the operating state of the smart housing device according to the adjustment instruction.

In some embodiments, the method for adjusting an operating state of a smart housing device further includes acquiring a state update message from the cloud server and updating the current state of the smart housing device displayed on the shortcut key according to the state update message. Updating the state of the smart housing device displayed on the shortcut key enables the user to obtain the current state of the smart housing device, and thereby to conveniently control the smart housing device.

Figure 2:
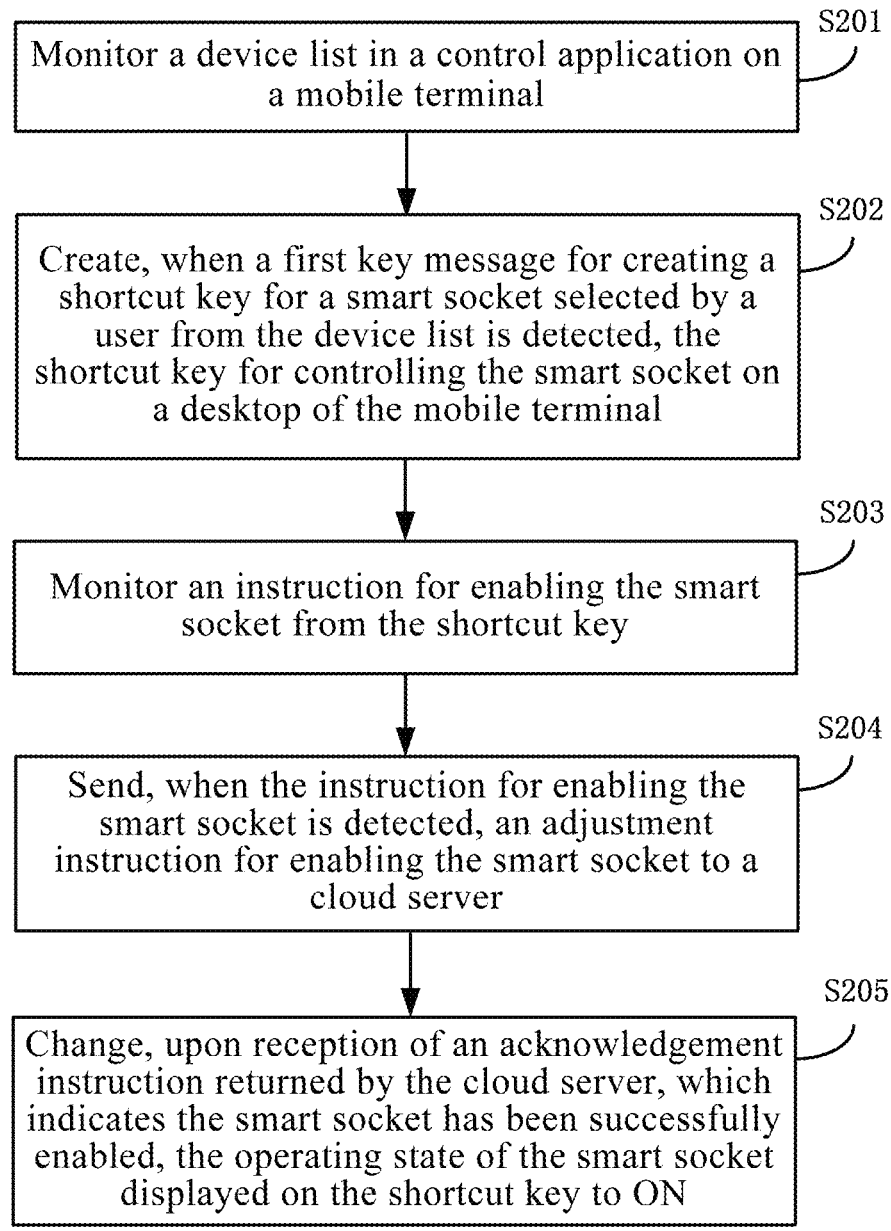
FIG. 2 is a flowchart illustrating a method for adjusting an operating state of a smart housing device according to another exemplary embodiment of the present disclosure.

FIG. 2 is a flowchart illustrating a method for adjusting an operating state of a smart housing device according to another exemplary embodiment of the present disclosure. In the method shown in FIG. 2, a current state of a smart socket is OFF, and the smart socket is controlled to be enabled. As illustrated in FIG. 2, at S201, a device list in a control application on a mobile terminal is monitored. The control application is configured to control smart housing devices. S201 is similar to S101 shown in FIG. 1, and thus detailed description of S201 is omitted.

At S202, when a first key message for creating a shortcut key for a smart socket selected by a user from the device list is detected, the shortcut key for controlling the smart socket is created on a desktop of the mobile terminal. S202 is similar to S102 shown in FIG. 1, and thus detailed description of S202 is omitted.

At S203, an instruction for enabling the smart socket from the shortcut key is monitored. In some embodiments, the instruction is a second key message from the shortcut key.

At S204, when the instruction for enabling the smart socket is detected, an adjustment instruction for enabling the smart socket is sent to a cloud server. The cloud server then adjusts the smart socket to an ON state according to the adjustment instruction.

At S205, upon reception of an acknowledgement instruction returned by the cloud server, which indicates the smart socket has been successfully enabled, the operating state of the smart socket displayed on the shortcut key is changed to indicate the smart socket is in an ON state.

According to the present disclosure, various indications can be used for displaying on the shortcut key to indicate the smart socket is in an enabled state or a disabled state, such as English characters "ON" or "OFF", or corresponding Chinese characters. This allows the user to quickly learn about the current operating state of the smart socket only by browsing the desktop of the mobile terminal, without opening the control application and then searching for the current state of the smart socket in the corresponding option, as required by conventional technologies.

Figure 3:
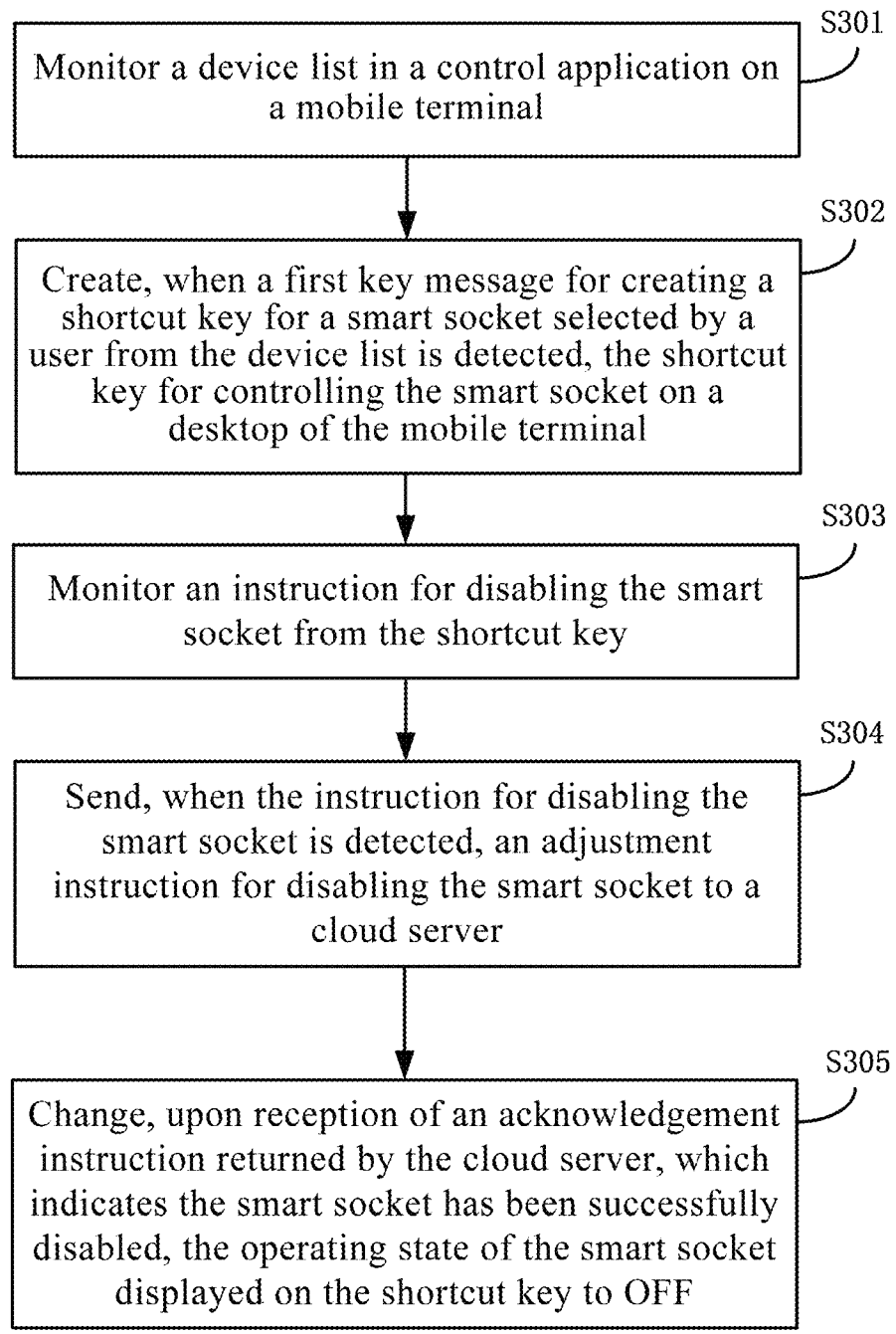
FIG. 3 is a flowchart illustrating a method for adjusting an operating state of a smart housing device according to another exemplary embodiment of the present disclosure.

FIG. 3 is a flowchart illustrating a method for adjusting an operating state of a smart housing device according to another exemplary embodiment of the present disclosure. In the method shown in FIG. 3, a current state of a smart socket is ON, and the smart socket is controlled to be disabled. As illustrated in FIG. 3, at S301, a device list in a control application on a mobile terminal is monitored. The control application is configured to control smart housing devices. S301 is similar to S101 shown in FIG. 1, and thus detailed description of S301 is omitted.

At S302, when a first key message for creating a shortcut key for a smart socket selected by a user from the device list is detected, the shortcut key for controlling the smart socket is created on a desktop of the mobile terminal. S302 is similar to S102 shown in FIG. 1, and thus detailed description of S302 is omitted.

At S303, an instruction for disabling the smart socket from the shortcut key is monitored. In some embodiments, the instruction is a second key message from the shortcut key.

At S304, when the instruction for disabling the smart socket is detected, an adjustment instruction for disabling the smart socket is sent to a cloud server. The cloud server then adjusts the smart socket to an OFF state according to the adjustment instruction.

At S305, upon reception of an acknowledgement instruction returned by the cloud server, which indicates the smart socket has been successfully disabled, the operating state of the smart socket displayed on the shortcut key is changed to indicate the smart socket is in an OFF state.

Figure 4A:
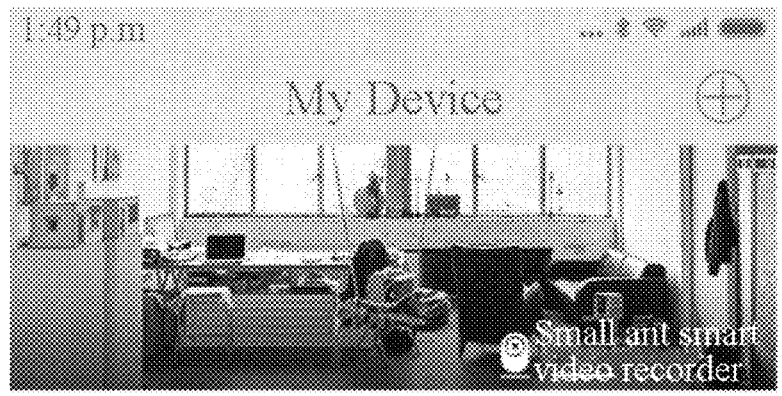
FIGS. 4A-4D schematically show an interface on a mobile terminal demonstrating an exemplary method for adjusting an operating state of a smart housing device.
Figure 4A:
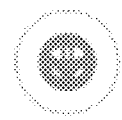
Figure 4A:
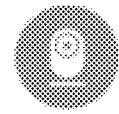
Figure 4A:
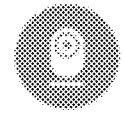
Figure 4A:
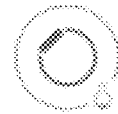
Figure 4A:
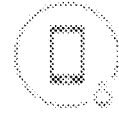
Figure 4A:
Figure 4B:
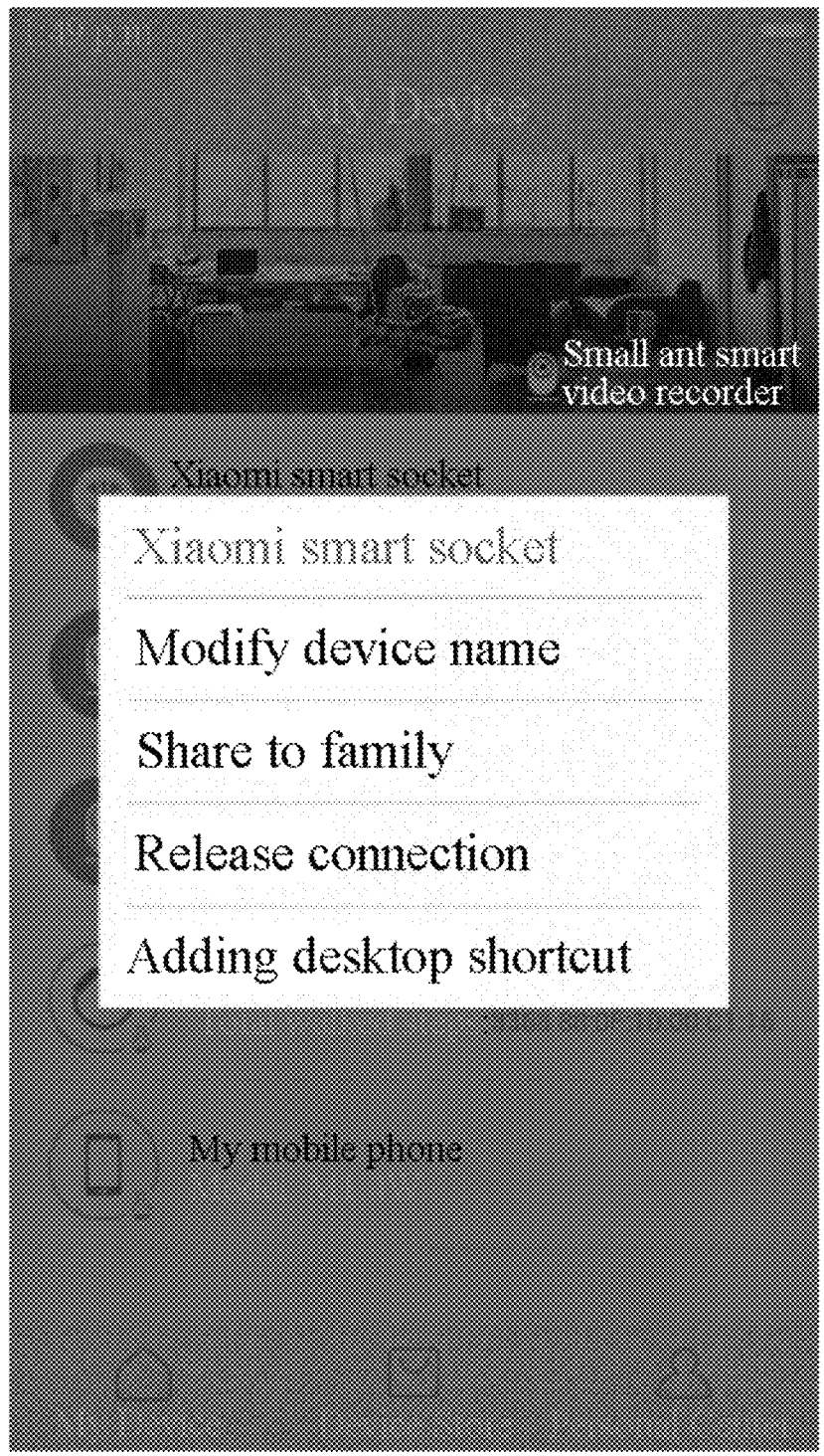
Figure 4C:
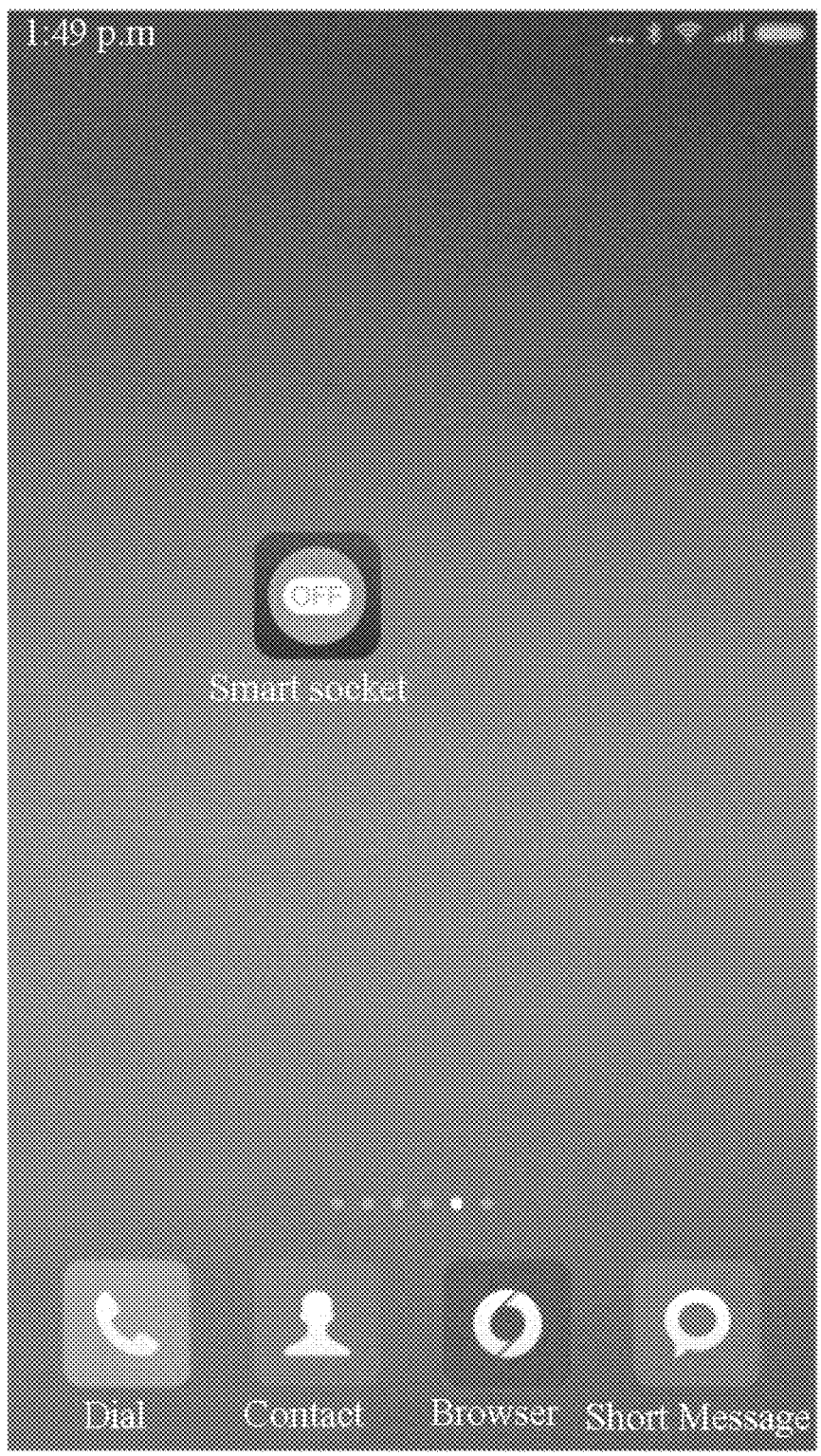
Figure 4D:
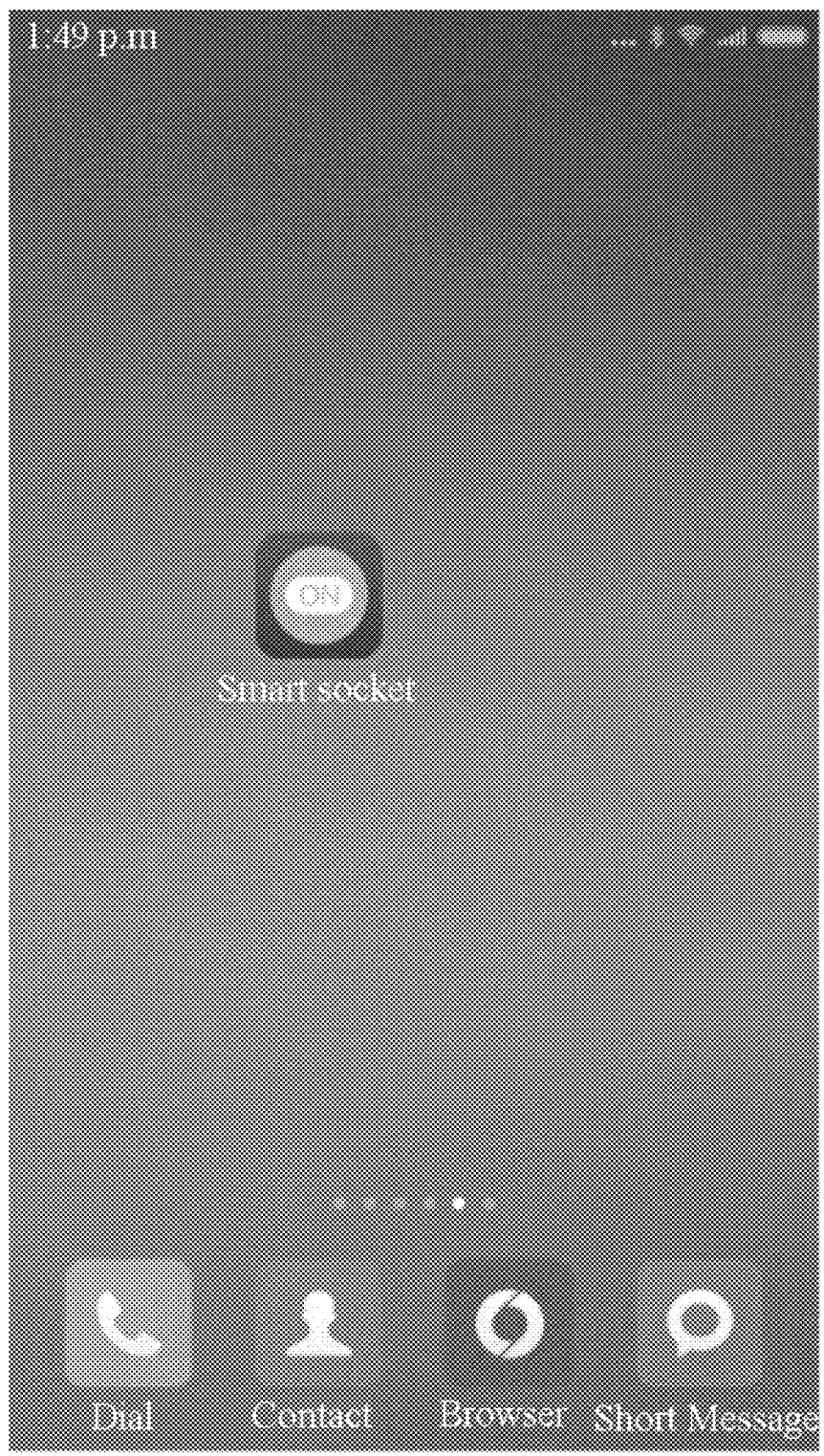

FIGS. 4A to 4D schematically show an interface on a mobile terminal demonstrating an exemplary method for adjusting an operating state of a smart housing device consistent with embodiments of the present disclosure. As illustrated in FIG. 4A, "Smart Housing App" on the mobile terminal is opened, and a corresponding smart housing device, for example, a Xiaomi smart socket, is found in the device list. When the Xiaomi smart socket is selected, a prompt menu is displayed, as illustrated in FIG. 4B. when an option "Adding desktop shortcut" in the prompt menu is selected, a shortcut key, displayed in the form of an icon, is generated on the desktop of the mobile terminal, as illustrated in FIG. 4C. Since at this time the Xiaomi smart socket is in a disabled state, an indication "OFF" is displayed associated with the shortcut. When the shortcut key is clicked, the Xiaomi smart socket is changed from the disabled state to an enabled state, and the indication on the shortcut key is changed to "ON," as illustrated in FIG. 4D.

In some embodiments, when the user manually operates a key on the smart socket to change the operating state of the smart socket, the smart socket sends an updated state to a cloud server. The cloud server sends the updated operating state to the mobile terminal. Upon receiving the updated operating state, the mobile terminal displays the current operating state of the smart socket on the icon displayed for the shortcut key.

Figure 5:
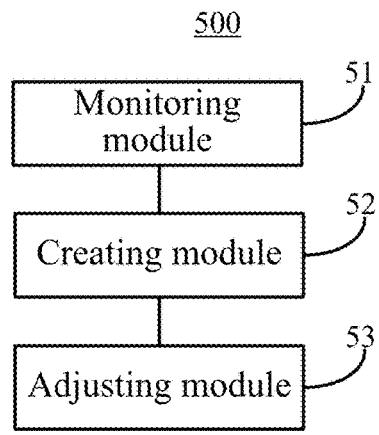
FIG. 5 is a block diagram illustrating an apparatus for adjusting an operating state of a smart housing device according to an exemplary embodiment of the present disclosure.

FIG. 5 is a block diagram illustrating an apparatus 500 for adjusting an operating state of a smart housing device according to an exemplary embodiment of the present disclosure. The apparatus 500 may be implemented, for example, in a mobile terminal. As illustrated in FIG. 5, the apparatus 500 includes a monitoring module 51, a creating module 52, and an adjusting module 53. The monitoring module 51 is configured to monitor a device list on a control application on the mobile terminal. The control application is configured to control smart housing devices. The creating module 52 is configured to create a shortcut key for controlling a smart housing device on a desktop of the mobile terminal when the monitoring module 51 detects a first key message for creating the shortcut key for the smart housing device selected by a user from the device list. The adjusting module 53 is configured to adjust a current state of the smart housing device via the shortcut key.

Figure 6:
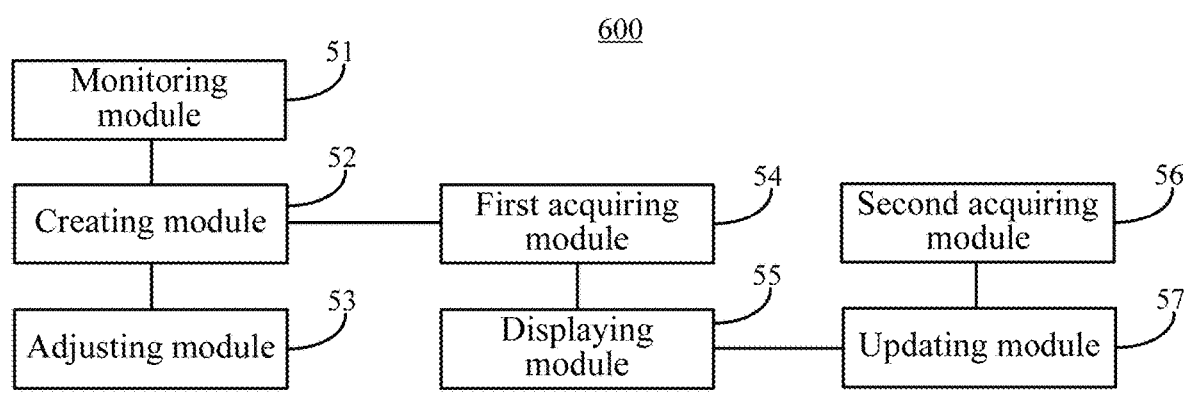
FIG. 6 is a block diagram illustrating another apparatus for adjusting an operating state of a smart housing device according to another exemplary embodiment of the present disclosure.

FIG. 6 is a block diagram illustrating an apparatus 600 for adjusting an operating state of a smart housing device according to another exemplary embodiment of the present disclosure. As illustrated in FIG. 6, the apparatus 600 includes the monitoring module 51, the creating module 52, the adjusting module 53, a first acquiring module 54, and a displaying module 55. The first acquiring module 54 is configured to acquire the current state of the smart housing device from a cloud server after the creating module 52 creates the shortcut key. The displaying module 55 is configured to display the current state acquired by the first acquiring module 54 on the shortcut key upon receipt of an acknowledgement instruction indicative of a successful adjustment returned by the cloud server.

In some embodiments, the adjusting module 53 may include a monitoring submodule and a sending submodule. The monitoring submodule is configured to monitor a second key message from the shortcut key created by the creating module 52. The sending submodule is configured to send an adjustment instruction for controlling the smart housing device to a cloud server when the monitoring submodule detects the second key message. The cloud server then adjusts the operating state of the smart housing device according to the adjustment instruction.

In some embodiments, as shown in FIG. 6, the apparatus 600 further includes a second acquiring module 56 and an updating module 57. The second acquiring module 56 is configured to acquire a state update message from the cloud server. The updating module 57 is configured to update the current state of the smart housing device displayed by the displaying module 55 on the shortcut key according to the state update message acquired by the second acquiring module 56.

Operation of the apparatuses 500 and 600 is consistent with the methods of the present disclosure, such as those described above. Therefore, details of the operation of the apparatuses 500 and 600 are omitted.

Figure 7:
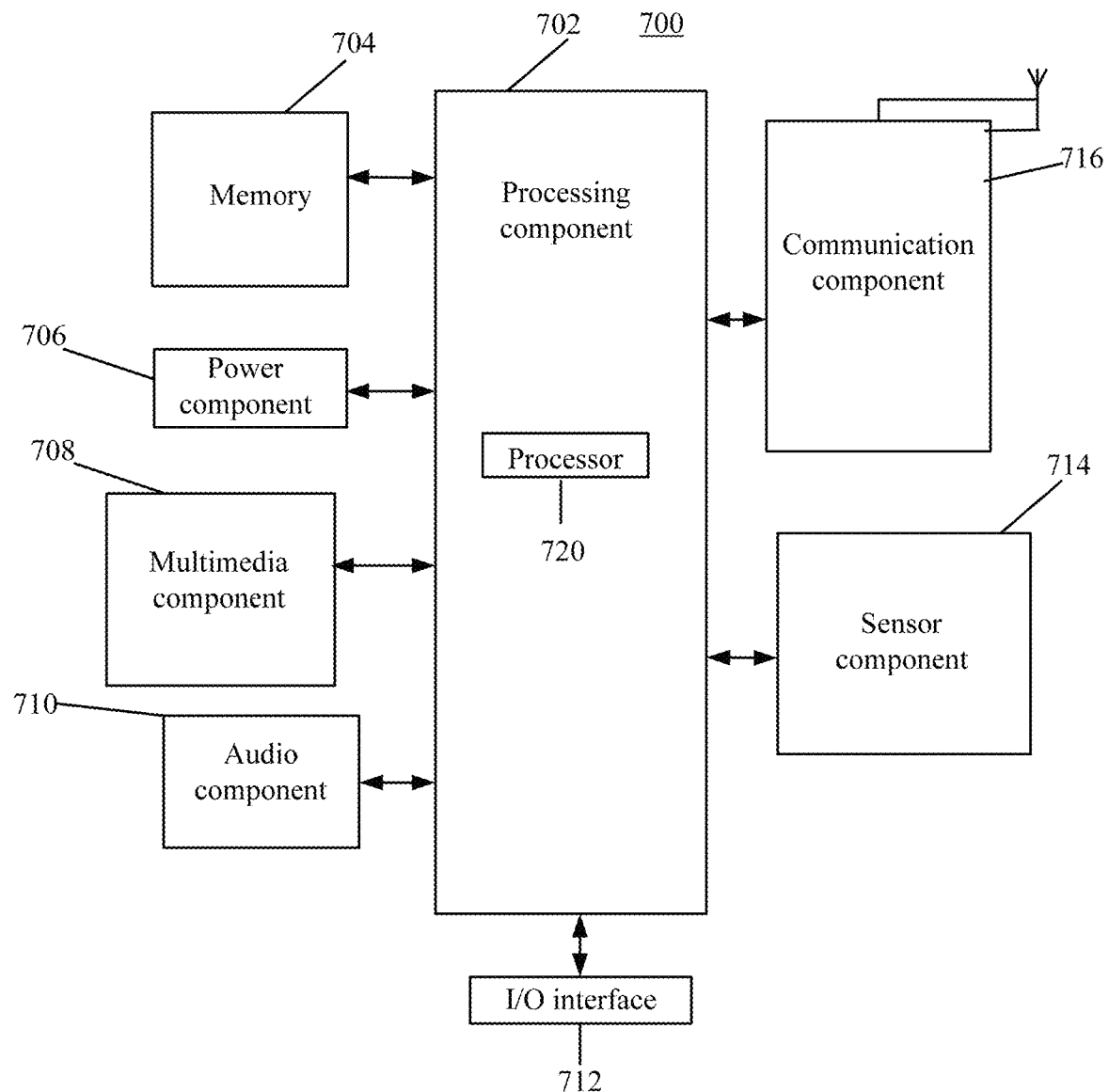
FIG. 7 is a block diagram illustrating an apparatus for adjusting an operating state of a smart housing device according to another exemplary embodiment of the present disclosure.

FIG. 7 is a block diagram illustrating an apparatus 700 for adjusting an operating state of a smart housing device according to another exemplary embodiment of the present disclosure. For example, the apparatus 700 may be a mobile phone, a computer, a digital broadcast terminal, a messaging device, a gaming console, a tablet, a medical device, exercise equipment, a personal digital assistant, or the like.

Referring to FIG. 7, the apparatus 700 includes one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions, for example in the form of computer code, to perform all or a part of the methods consistent with embodiments of the present disclosure. In addition, the processing component 702 may include one or more modules that facilitate the interaction between the processing component 702 and other components. For example, the processing component 702 may include a multimedia module to facilitate the interaction between the multimedia component 708 and the processing component 702.

The memory 704 is configured to store various types of data to support the operations of the device 700. Examples of such data include instructions for any application or method operated on the apparatus 700, contact data, phonebook data, messages, pictures, videos, and the like. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power supplies, and other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive external multimedia data when the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the apparatus 700 is in an operation mode, such as a call mode, a recording mode, or a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and a peripheral interface module, such as a keyboard, a click wheel, a button, or the like. The buttons may include, but are not limited to, a home button, a volume button, a starting button, and a locking button.

The sensor component 714 includes one or more sensors to provide status assessments of various aspects of the apparatus 700. For example, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communications, wired or wirelessly, between the apparatus 700 and other devices. The apparatus 700 may access a wireless network based on a communication standard, such as WiFi, 3G or 4G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, for example in the form of computer code, such as included in the memory 704, executable by the processor 720 in the apparatus 700, for performing the methods consistent with embodiments of the present disclosure. For example, the non-transitory computer-readable storage medium may be a ROM, a random access memory (RAM), a compact disc read-only memory (CD-ROM), a magnetic tape, a floppy disc, an optical data storage device, or the like.

According to methods and apparatuses consistent with embodiments of the present disclosure, operation of a smart housing device by a user is improved, such that the user can conveniently and quickly change the state of the smart housing device. As such, the smart housing device can be more conveniently controlled. This facilitates the use of the smart housing device.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for adjusting an operating state of a smart housing device, comprising:
    monitoring a device list in a control application on a mobile terminal, the control application being configured to control the smart housing device, and the device list listing the smart housing device;
    creating a shortcut key as an icon for controlling the smart housing device on a desktop of the mobile terminal, in response to selecting the smart housing device from the device list by a user;
    acquiring, after the shortcut key is created, a current state of the smart housing device from a cloud server;
    displaying the current state on the desktop using the icon of the shortcut key;
    adjusting an operating state of the smart housing device according to an adjustment instruction provided in response to actuation of the shortcut key without opening the control application;
    changing, upon receipt of an acknowledgement instruction returned by the cloud server that indicates the operating state of the smart housing device has been successfully adjusted, the shortcut key by changing the icon to indicate the adjusted operating state of the smart housing device and changing the adjustment instruction to be provided in response to actuation of the changed shortcut key; and
    displaying the changed shortcut key.

2. The method according to claim 1, wherein:
    adjusting the operating state of the smart housing device includes:
        sending the adjustment instruction for adjusting the smart housing device to the cloud server for the cloud server to adjust the operating state of the smart housing device according to the adjustment instruction.

3. The method according to claim 2, further comprising:
    acquiring a state update message from the cloud server; and updating, according to the state update message, the current state of the smart housing device displayed on the desktop.

4. An apparatus for adjusting an operating state of a smart housing device, comprising:
one or more processors;
a memory storing computer code that, when executed by the one or more processors, causes the one or more processors to:
monitor a device list in a control application on a mobile terminal, the control application being configured to control the smart housing device, and the device list listing the smart housing device;
create a shortcut key as an icon for controlling the smart housing device on a desktop of the mobile terminal, in response to selecting the smart housing device from the device list by a user;
acquire, after the shortcut key is created, a current state of the smart housing device from a cloud server;
display the current state on the desktop using the icon of the shortcut key;
adjust an operating state of the smart housing device according to an adjustment instruction provided in response to actuation of the shortcut key without opening the control application;
change, upon receipt of an acknowledgement instruction returned by the cloud server that indicates the operating state of the smart housing device has been successfully adjusted, the shortcut key by changing the icon to indicate the adjusted operating state of the smart housing device and changing the adjustment instruction to be provided in response to actuation of the changed shortcut key; and
display the changed shortcut key.

5. The apparatus according to claim 4, wherein:
the computer code further causes the one or more processors to:
send the adjustment instruction for adjusting the smart housing device to the cloud server for the cloud server to adjust the operating state of the smart housing device according to the adjustment instruction.

6. The apparatus according to claim 5, wherein the computer code further causes the one or more processors to:
acquire a state update message from the cloud server; and
update, according to the state update message, the current state of the smart housing device displayed on the desktop.

7. A non-transitory computer-readable storage medium having stored therein computer code that, when executed by one or more processors of an apparatus, causes the apparatus to:
monitor a device list in a control application on a mobile terminal, the control application being configured to control a smart housing device, and the device list listing the smart housing device;
create a shortcut key as an icon for controlling the smart housing device on a desktop of the mobile terminal, in response to selecting the smart housing device from the device list by a user;
acquire, after the shortcut key is created, a current state of the smart housing device from a cloud server;
display the current state on the desktop using the icon of the shortcut key;
adjust an operating state of the smart housing device according to an adjustment instruction provided in response to actuation of the shortcut key without opening the control application;
change, upon receipt of an acknowledgement instruction returned by the cloud server that indicates the operating state of the smart housing device has been successfully adjusted, the shortcut key by changing the icon to indicate the adjusted operating state of the smart housing device and changing the adjustment instruction to be provided in response to actuation of the changed shortcut key; and
display the changed shortcut key.

\* \* \* \* \*